(12) United States Patent
Morgan et al.

(10) Patent No.: US 8,077,547 B2
(45) Date of Patent: Dec. 13, 2011

(54) METHOD AND APPARATUS FOR SEISMIC EXPLORATION

(75) Inventors: Thomas R. Morgan, Cypress, TX (US); James C. Manatt, Roswell, NM (US)

(73) Assignee: Providence Technologies, Inc., Roswell, NM (US)

( * ) Notice: Subject to any disclaimer, the term of this patent is extended or adjusted under 35 U.S.C. 154(b) by 533 days.

(21) Appl. No.: 12/238,621

(22) Filed: Sep. 26, 2008

(65) Prior Publication Data

US 2010/0080081 A1    Apr. 1, 2010

(51) Int. Cl.
*G01V 1/04* (2006.01)
(52) U.S. Cl. .............................. 367/61; 367/37; 181/111
(58) Field of Classification Search .................. 181/107, 181/111, 113; 367/14, 37, 61
See application file for complete search history.

(56) References Cited

U.S. PATENT DOCUMENTS

| | | | |
|---|---|---|---|
| 3,088,541 A | 5/1963 | Alexander et al. | |
| 4,346,462 A | 8/1982 | Du | |
| 4,611,312 A | 9/1986 | Ikeda | |
| 4,733,747 A * | 3/1988 | McCormack | 181/111 |
| 5,073,876 A | 12/1991 | Propes | |
| 5,184,329 A * | 2/1993 | Regnault et al. | 367/23 |
| 5,721,710 A | 2/1998 | Sallas et al. | |
| 5,822,269 A | 10/1998 | Allen | |
| 5,924,049 A | 7/1999 | Beasley et al. | |
| 6,002,641 A | 12/1999 | Chien | |
| 6,327,537 B1 | 12/2001 | Ikelle | |
| 6,493,636 B1 | 12/2002 | DeKok | |
| 6,754,590 B1 | 6/2004 | Moldoveanu | |
| 6,865,489 B2 | 3/2005 | Jing | |
| 6,934,219 B2 | 8/2005 | Burkholder et al. | |
| 7,050,356 B2 | 5/2006 | Jeffryes | |
| 7,123,548 B1 | 10/2006 | Uzes | |
| 7,295,490 B1 | 11/2007 | Chiu et al. | |
| 7,830,748 B2 | 11/2010 | Guigne et al. | |
| 2002/0105464 A1 | 8/2002 | Bevington | |
| 2006/0164916 A1 | 7/2006 | Krohn et al. | |
| 2006/0227657 A1 | 10/2006 | Tveide et al. | |
| 2006/0229816 A1 | 10/2006 | Stinson et al. | |

(Continued)

FOREIGN PATENT DOCUMENTS

WO    WO-0116622 A1    3/2001

(Continued)

OTHER PUBLICATIONS

"International Application Serial No. PCT/US2009/005339, International Preliminary Report on Patentability mailed Apr. 7, 2011", 8 pgs.

(Continued)

*Primary Examiner* — Ian Lobo
(74) *Attorney, Agent, or Firm* — Schwegman, Lundberg & Woessner, P.A.

(57) ABSTRACT

The disclosure identifies method and apparatus for seismic exploration which may be used to provide improved positioning of land-based seismic sources in an array. Also described are methods which make use of the improved positioning to allow, in some examples, improved direction or distribution of the energy beam resulting from actuation of the sources. Some methods make use of the described techniques to steer the energy beam; and in some cases at each source or a distribution location, multiple shots will be taken to distribute the beam in multiple orientations relative to the central source point.

18 Claims, 13 Drawing Sheets

U.S. PATENT DOCUMENTS

2006/0291328 A1 12/2006 Robertsson et al.
2007/0091721 A1 4/2007 Jeffryes
2009/0122645 A1* 5/2009 Guigne et al. .................. 367/56

FOREIGN PATENT DOCUMENTS

WO  WO-2008068730 A2  6/2008

OTHER PUBLICATIONS

"International Application Serial No. PCT/US2009/005339, Search Report mailed Dec. 21, 2010", 4 pgs.

"International Application Serial No. PCT/US2009/005339, Written Opinion mailed Dec. 21, 2010", 8 pgs.

Arnold, M E, et al., "A New Distributed Charge", Geophysics, 46(9), (Sep. 1981), 1216-26.

Arnold, M E, "Beam formed with Vibrator Arrays", Geophysics, 42(7), (Dec. 1977), 1321-38.

Pritchett, W C, "Beam Steering in the Field and in Processing", Believed to be from Acquiring Better Seismic Data. by Pritchett (1989).

Sercel, "Brochure of the VE416", (1989), 1 pg.

Wilkinson, Keith, et al., "Seismic data acquisition and processing using measured motion signals on vibrators", 1998 SSEG Expanded Abstracts, 2 pgs.

* cited by examiner

METHOD AND APPARATUS FOR SEISMIC EXPLORATION

BACKGROUND OF THE INVENTION

The present invention relates generally to methods and apparatus for seismic exploration; and more specifically relates to improved methods and apparatus for the initiation of seismic sources during such exploration. The present invention is applicable to all land based sources but offers particular advantages when applied to initiation of vehicle mounted surface sources via radio-controlled signals such as vibratory sources.

The basic principal of seismic surveying, whether on land or at sea, is to periodically actuate man-made sources to produce seismic energy that propagates into the earth. This propagating seismic energy is partially reflected, refracted, diffracted and otherwise affected by one or more geologic structures within the earth. The affected seismic energy is detected by sensors, or "receivers," placed at or near the earth's surface or the air-sea interface. The receivers are attached to recording instruments that make a permanent record of the detected seismic signals. From the data of these records, the geologic structures of the earth may be analyzed for any of a variety of purposes.

In conventional practice, seismic exploration uses multiple physical sources at each acquisition source location. Such a multiplicity of sources is called a source array and the individual source elements of the array may be distributed both vertically and horizontally in space along or near the earth's surface or the air-sea interface. Typically, the combined energy of the multiple sources is treated as a single source point and the energy generated will be generally concentrated in a particular direction and will form a "beam."

In the marine environment, complex triggering sequences are normally employed to produce a shaped and directed source pulse from a multiplicity of airguns towed behind the seismic survey vessel. Source-to-source initiation delays are planned in advance through analytical design and experimentation to generate an overall source pulse that will be directed downwardly, through the water column and the earth below the sea floor.

In current practice on land, actively directing the source beam in a specific, selected direction is not commonly done. The use of multiple sources is generally necessary to produce sufficient energy to illuminate structures deep in the earth in situations where a single source does not generate enough energy for reliable detection at the receivers and to structure the source energy pattern to reduce noise and ameliorate the effects of unwanted coherent signal. A recording system connected to multiple physically separated receiver units detects and makes a permanent record of the energy arriving at the receivers, some of which has propagated through the earth's interior.

On land, source initiation sequences have occasionally been employed to similarly shape the source energy produced by an array of multiple dynamite charges. The basic objectives and the analysis and design principles are the same as mentioned above for marine sources.

The dominant source employed on land, however, is the vibratory source. In conventional systems using vibratory sources, the multiple sources are simultaneously initiated by a triggering mechanism that is connected to all the sources and the recording system. The mechanism also provides a "time zero" reference point (the instant of source initiation) for the recording system.

Vibratory sources used on land are limited to placement on the earth's surface. This limitation combined with the current practice of simultaneous source initiation, results in the pointing direction of the resulting source energy beam being perpendicular to the surface. It should be noted that this direction will only be vertically downward where the earth's surface is horizontal. In general the beam pointing direction is vertically downward and not within the control of the survey operator. This can have significant deleterious effects on returning energy levels at the detectors for certain configurations of subsurface reflecting interfaces.

Beam forming tests using vibratory sources have been performed in the past. In currently known examples, such field tests were conducted as series of field tests using source-to-source trigger initiation time delays across a linearly spaced vibrator array. The main purpose of the study was to compare beam steering in the field versus beam steering during data processing. The work was done in an area with a generally planar surface and relatively horizontal subsurface geologic interfaces.

However, when such subsurface interfaces are not generally parallel to the surface, but are oriented in such a way as to reflect the main energy of the source beam in a direction away from the detecting sensors, little useful recorded reflection energy from the interfaces may result. Source energy propagation will be such that certain directions will be more highly illuminated than other directions and the relative strength of detected signals at the receivers will be directionally dependent. Even with horizontal subsurface interfaces, a non-horizontal earth's surface will point the beam in such a manner as to reduce the amount of reflection energy recorded at the detectors. The ability to overcome these deficiencies by directing the source beam in a controlled fashion would be a useful improvement over currently-known methods.

A second deleterious effect results from the placement of sources of any type on the earth' surface. This can result in the generation of unwanted horizontally traveling surface waves, often referred to as "ground roll." These surface waves are characterized by low frequency content and low velocity, and often arrive at the detectors at the same time as reflection energy from the deeper parts of the earth's interior. When this simultaneous, or near simultaneous, arrival occurs, it often masks the desired deep reflection arrivals needed to make quality images of subsurface formations.

Accordingly, a number of strategies have been adopted by the industry to reduce or mitigate the affects of ground roll. For example, receiver arrays can be designed and deployed to reduce the effects of ground roll at the recording location. Receivers in the array may be spaced and deployed along directions that produce destructive interference of ground roll when the detected signals from the individual receivers in the array are summed together.

An analogous principle has been applied to seismic sources. The spacing and deployment direction of the sources in the source array can be established to suppress the generation of ground roll via destructive interference. This approach assumes the sources in the array are actuated simultaneously and that their spatial organization be accurately designed and deployed; as the effective implementation of this technique relies upon the placement of sources according to a relatively exact spacing. Any deviation from this ideal placement will result in degradation of the suppression of ground roll effects. An exception to this simultaneous initiation of vibratory sources is a method of U.S. Pat. No. 7,050,356, where non-simultaneous source initiation is used for reducing survey time. This approach still suffers from the problems and effects from source placement errors, and the ground roll suppression inefficiencies that result.

In conventional source array design, the surface is typically assumed to be a planar, horizontal surface, along which the sources will be distributed. The ideal horizontal source separation distance is directly related to the dominant frequency and propagation velocity of the ground roll to preferably be suppressed. If the sources all occupy the same plane, that is, there are no vertical separations, the combined source energy or beam will be directed vertically downward. The simultaneous triggering of the multiple sources forces this situation; and is advantageous when the objectives of the data acquisition lie vertically below the source and receiver arrays and are configured as horizontal or gently dipping interfaces. However, this vertical direction of the beam can lead to less than optimal results where the subsurface formations are not parallel to the surface.

Another possible source of error in land-based seismic exploration systems is that of inaccurate placement of the sources forming the ground roll suppressing array. Current practice does not generally provide for surveying each individual vibratory source location in advance (currently a costly and time-consuming process), to provide sufficient information to assure the ability to place each vibratory source correctly. This problem can be further complicated by unavoidable obstructions and other surface conditions that prevent the placement of one or more sources of the array in the intended location. Such source placement errors limit the ability of the source array to optimally suppress ground roll. Additionally, in many instances, the configuration of the earth being seismically surveyed will not lend itself to such exact placements. For example, there are often elevation variations of the surface that violate the basic assumptions of the array design.

The present methods described herein combine the ability to correctly position the elements of the source array, and to achieve a desired beam direction while also allowing suppression of ground roll. Accordingly, the present invention provides a new method and apparatus which uses controlled placement and initiation of seismic sources to improve the performance of seismic exploration systems and operations. The invention permits directing the source energy beam while at the same time allowing ground roll suppressing source arrays to be optimally deployed. The present invention offers additional advantages and benefits as will be set forth herein.

SUMMARY OF THE INVENTION

The present invention includes methods of seismic exploration which facilitate compensation for various surface and subsurface geological considerations. For example, in some examples of the invention, a seismic source array may be actuated in order to direct the main axis of an energy beam resulting from the source array beam in a desired direction. This may be used to direct the beam either based upon subsurface formations of interest, and/or to compensate for surface contours or characteristics. The energy beam may be directed through use of delayed triggers of multiple seismic sources, defining an actuation interval between the sources. In some preferred examples, the present invention allows the precise placement of the seismic sources in the array through use of precise positioning data of the sources. This positioning data may sometimes be used to optimize the surface placement of the seismic sources so as to not only achieve the desired beam orientation, but also to facilitate suppression of ground roll interference. Additionally, in some examples of the invention, the sources of the array will be actuated at a plurality of source positions, and at one or more of such positions, the described techniques will be used to direct the resulting energy beam through a range of selected directions. In some preferred examples, this will be performed at all source group locations.

In the figures, primed reference numbers (example: 60', 60"), may be used to indicate elements similar to other elements associated with the stated reference number, but subject to an apparent difference in some quality, property or placement, as identified in the specification.

DETAILED DESCRIPTION OF EXEMPLARY EMBODIMENTS

In the following description, numerous specific details are set forth. However, it should be understood that embodiments of the invention may be practiced without these specific details. In other instances, well-known circuits, structures and techniques have not been shown in detail in order not to obscure the understanding of the invention. In this description, references to "one embodiment" or "an embodiment" mean that the feature being referred to is, or may be, included in at least one embodiment of the invention. Separate references to "an embodiment" or "one embodiment" in this description are not intended to refer necessarily to the same embodiment; however, neither are such embodiments mutually exclusive, unless so stated or except as will be readily apparent to those of ordinary skill in the art. Thus, the present invention can include any variety of combinations and/or integrations of the embodiments described herein, as well as further embodiments as defined within the scope of the claims. Additionally, in this description, the phrase "exemplary embodiment" means that the embodiment being referred to serves as an example or illustration; and is not intended to indicate any qualitative evaluation of that embodiment, or any preferred status of that embodiment.

Figure 1:
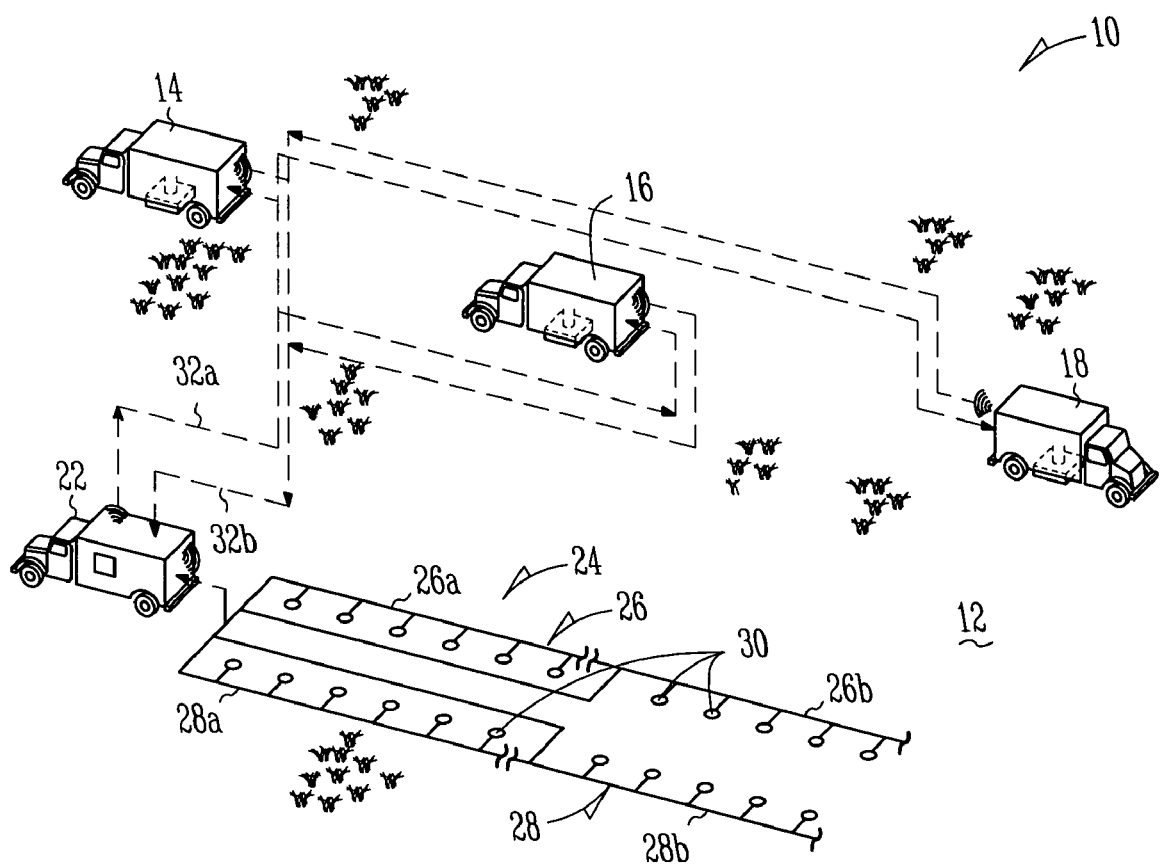
FIG. 1 schematically depicts an exemplary seismic exploration system disposed in an exemplary placement on the earth's surface.

Referring now to the drawings in more detail, and particularly to FIG. 1, therein is schematically depicted exemplary seismic exploration system, indicated generally at 10, disposed in a foreseeable placement on the earth's surface 12. In this depicted example, exemplary seismic exploration system 10 includes three trucks, each carrying a single vibratory source 14, 16, 18, arrayed generally along a straight line. The relative placement of sources 14, 16, 18 is by way of example only, and no scale is intended. Those skilled in the art will recognize that virtually any desired number of sources, from two on up, may be used with the present invention.

Seismic exploration system 10 also includes a recording truck 22 operatively coupled to a receiver array, indicated generally at 24. As will be discussed in more detail in reference to FIG. 2, recording truck 22 will carry systems for both initiating the sources, as well as for recording data from receiver array 24. Receiver array 24 is depicted with two survey lines 26, 28; however, alternatively, either a single line, or more commonly, many more lines, may be used. As can be seen in FIG. 1, each example survey line 26, 28 is divided into a plurality of sections or sub-arrays called receiver groups, indicated at 26a, 26b and 28a, 28b. Of course, receiver lines 26 and 28 may each be comprised of many more than two groups. In general the lines of groups or sub-arrays of the overall receiver array are distributed in relation to the center point, or source location, of the source array, with the result that the receiver array 24 can be viewed as being divided into two portions, one to each side of the source location. This enables the collection of data from either portion of the overall receiver array, or both portions, as may be desired, and as discussed later herein. As is indicated by the dotted lines 32a and 32b, communication between each vibratory source 14, 16, 18 and recording truck 22 is preferably through inbound and outbound radio frequency (Rf) wireless links 32a, 32b, respectively.

Receiver array 24 includes a plurality of individual receivers (indicated representatively at 30) that are typically spaced a fixed distance apart, wherein each receiver will preferably including one or more axial sensors, typically arranged in angularly-offset relationships to one another, in order to receive the generated seismic signals. The seismic signals will include, but are not limited to, all subsurface reflections, refractions, diffractions and surface waves. The various seismic signals received at each receiver in each group are combined together into a single signal, in a conventional manner, and that signal is transmitted to a recording system (40 in FIG. 2). Thus, each receiver group results in one seismic recording, the physical location of which is called the "receiver station" at the center of the receiver group. Receiver group and receiver array design has the same basic objectives, and follows the same basic principals, as source array design. Both the source and receiver group and array plans are generally done at the same time to provide the optimal approach to suppression of unwanted signals and enhancement of useful signals. The techniques of the present invention are independent of receiver array (or group) design; and thus the exact locations and patterns of the individual receivers in the receiver array does not directly affect the methods and apparatus of this invention, though appropriate design and placement of the receiver array, in accordance with conventional techniques, will impact the data ultimately collected.

Figure 2:
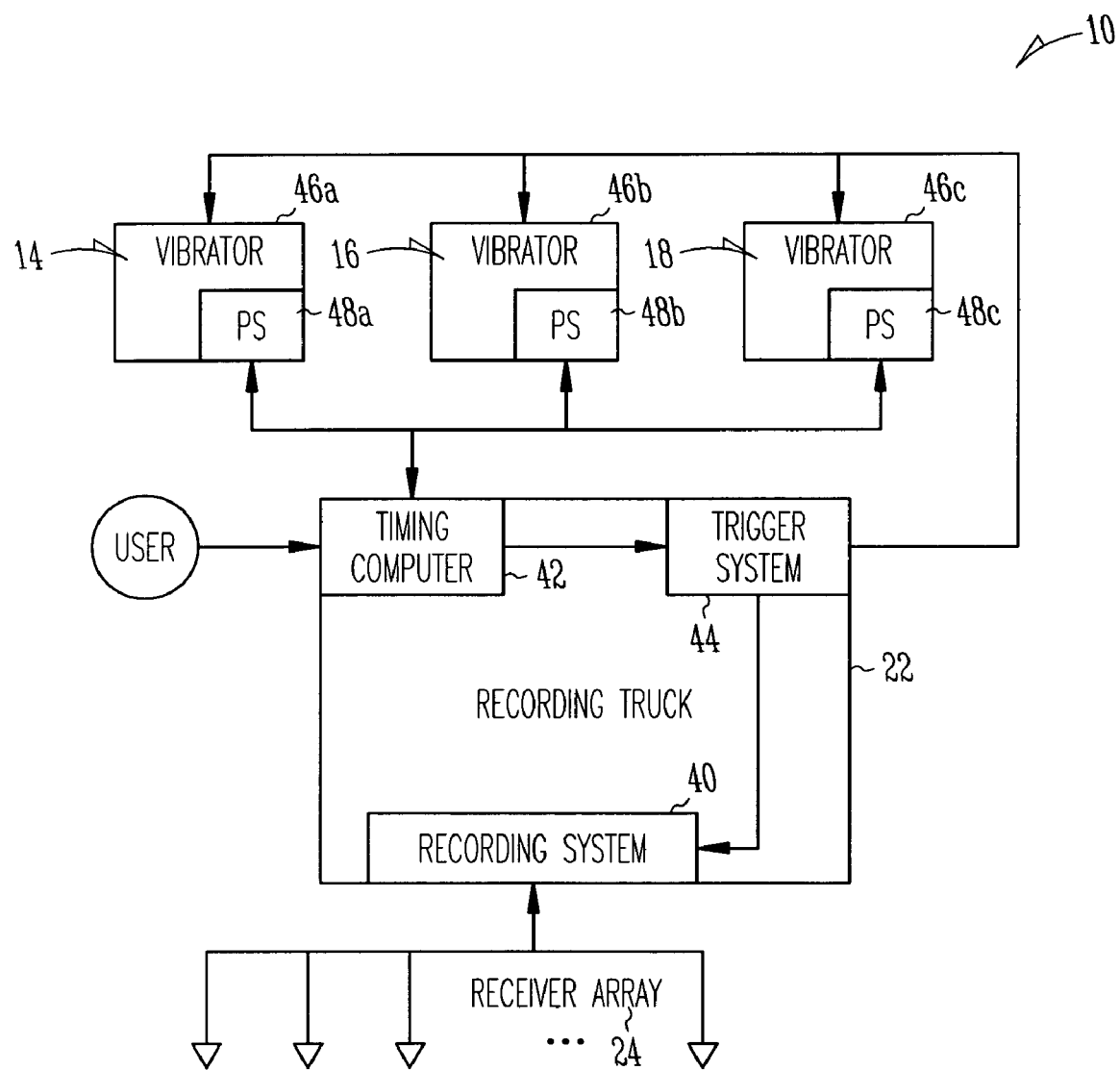
FIG. 2 depicts the seismic exploration system of FIG. 1, in block diagram form, and in more detail.

Referring now to FIG. 2, therein is depicted seismic exploration system 10 in block diagram form. Recording truck 22, as noted previously, includes a conventional recording system 40, configured to receive data from receiver array 24. It should be understood that although a recording truck is described, as one common implementation; the described components need not be carried by a truck, or even by the same mechanism. The described functionality may be implemented by any system capable of the described functionality and communication with the sources in the field.

Recording truck 22 also includes a control computer 42, configured to monitor and record positioning information and to determine source initiation intervals in accordance with the techniques as generally described herein. Control computer 42 may be an appropriately programmed computer of virtually any desired configuration, as described in reference to FIG. 14. Recording truck also includes a trigger system 44, operably coupled to control computer 42. Trigger system 44 will be similar to conventional trigger systems; with the exception that conventional trigger systems are typically configured to send a single trigger signal simultaneously to all sources. In contrast, trigger system 44 will have the capability to send individualized trigger signals to some, and preferably to all, sources in the array 14, 16, 18. This may be accomplished by sending a conventional trigger signal to the various sources using different radio frequencies, or by using the same radio frequency and digitally coding the trigger signals for individual identification by the appropriate source. Although such digital coding of trigger signals is not currently used in the seismic industry, the specific implementation of such functionality into conventional seismic systems is within the ability of persons skilled in the art of digital radio frequency ("Rf") communications, and having the benefit of this disclosure.

Each source preferably includes both the vibratory source mechanism 46a-c and a position-identifying system 48a-c. Each position-identifying system 48a-c is preferably a global positioning (GPS) system. The present invention may be performed without such a dedicated positioning system on each vibratory source 14, 16, 18. For example, it is possible for the present invention to be practiced by obtaining positioning data manually for each source, such as through handheld GPS devices, or through standard surveying techniques; and for such positioning data to be manually entered into control computer 42 periodically as needed. However, the more automated implementation using GPS-based position identification or another automated method is preferred (manual methods being more time consuming and error-prone). The positioning systems will be capable of identifying the source location in a suitable coordinate space and frame. Each positioning system 48a-c is in at least selective communication with control computer 42, such as through wireless links 39a, 39b. In particularly preferred implementations, each positioning system 48a-c and control computer 42 will have displays or other mechanisms to enable operators to position the sources as close as possible to the planned locations, and to monitor such placement. As depicted in FIG. 1, in most examples of the invention, the communication between each positioning system 48a-c and control computer 42 will be established through radio frequency (Rf) wireless links. Hardwired communications (electrical or optical) are less-desired due to the need for constant mobility of the sources.

Additionally, trigger system 44 is also in selective communication with each vibratory source mechanism 46a-c of each source 14, 16, 18. Again, this communication will preferably be by an Rf link.

In operation of seismic exploration system 10, the sources 14, 16, 18 will be moved into position, as closely as possible, according to the survey plan. As the sources are placed, the actual position relative to X, Y, and Z axes, is determined by the GPS or other positioning systems mounted on each vibratory source. While sources 14, 16, 18 are being moved into position, control computer 42 maintains a record of the source positions and provides feedback to the vibratory source operators to assist in positioning the sources in their proper locations. Ideally, these positions will match the intended array design exactly. However, as noted previously, in practice, especially in rough terrain and in the vicinity of obstructions, this is rarely true; and the vertical and horizontal locations of one or more of the vibratory sources may depart from the ideal. As will be described in more detail later herein, positioning information of each source is used by the control computer to determine the best source spacing, triggering sequence and trigger delays of the sources in the array, as it has actually been deployed on the ground, in order to meet the objectives of the array design and desired directional propagation of seismic energy. Timing system 42 communicates the triggering sequence and timing to trigger system 44. At a desired time, trigger system 44 will be initiated, and will actuate sources 14, 16, 18 and recording system 40, and the survey data will be collected. Once the vibratory sweep and recording phase is completed, sources 14, 16, 18 are moved to the next set of locations according to the plan, and the cycle is repeated until the survey is completed.

Figure 3:
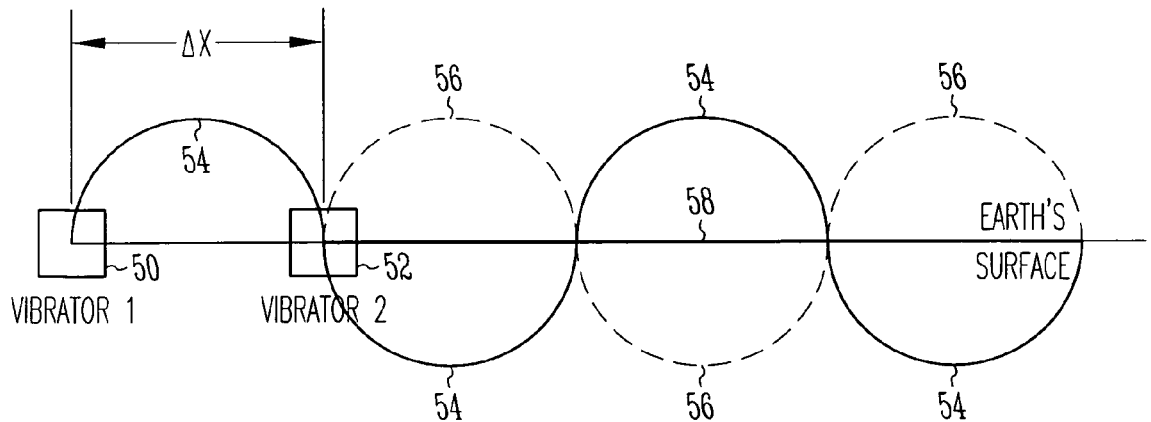
FIG. 3 depicts an idealized representation of the suppressing of lateral noise of a source array through destructive interference.

Referring now to FIG. 3, therein is depicted a schematic representation depicting the basic principle behind the ground roll suppressing capability of a source array in accordance with conventional practice, where the vibratory sources are simultaneously actuated. For clarity, this example depicts the use of two sources 50, 52. Upon actuation, each source 50, 52, will generate a ground roll wave (idealized for this example) traveling along the earth's surface. The wave of source 50 is depicted in its various phases in solid lines, at 54; while the various phases of the wave of source 52 are depicted in dashed lines at 56. The objective in such a system is to space the sources a distance apart such that the peak of the horizontal ground roll wave 54, generated by first source 50, aligns with the trough of the horizontal ground roll wave 56, generated by source 52. The sum of the two signals will then be at zero amplitude, thereby conceptually following a flat line 58, at the earth's surface. In this manner, the peaks and troughs destructively interfere, and thereby cancel one another, suppressing the ground roll as it propagates toward and past the receivers.

In designing such a system, the optimal spacing ($\Delta X$) between the two sources 50, 52 is determined by the dominant frequency (F) of the ground roll and its propagation velocity (V) according to the relation:

$$\Delta X = V/F \quad \text{Eq. 1}$$

As noted previously, current practice typically assumes that sources 50, 52 are located on a common horizontal plane (i.e., they are co-planar, $\Delta Z=0$) and are aligned along the direction of the traverse ($\Delta Y=0$). Thus, $\Delta Y$ and $\Delta Z$ do not contribute to the source separation calculation.

The determined source spacing ($\Delta X$) can be converted into an equivalent delay time according to the relation:

$$\Delta T = \Delta X/V \quad \text{Eq. 2}$$

where V is the surface wave propagation velocity. As is apparent from the discussion above, even though the two sources are initiated simultaneously, as a result of their separation there is a time delay along the earth's surface between the surface waves produced by the two sources. This time delay and subsequent alignment of the wave peak from one source with the wave trough from the other source creates the condition for the desired destructive interference. As is apparent from FIG. 3, any departure from the ideal and planned separation distance, ($\Delta X$ in a planar distribution), and hence the associated planned time delay ($\Delta T$) will result in less ground roll suppression as the surface waves produced by the two sources will no longer align properly to provide the maximal destructive interference. It should be noted that in general, and for most practical implications, the array ground roll suppression effect is a function of the relative separation of the two sources along the earth's surface and is independent of the direction of the line connecting the two sources, because insofar as the earth's physical properties, specifically propagation velocity, typically are assumed to not substantially vary with direction in the dimensions involved in a typical survey.

The exact spacing between vibratory sources for any given survey will be a function of the surface properties in the survey area. As one example, for a survey area having a ground roll velocity of 6600 feet/sec with a dominant frequency of 12.5 Hz, a spacing between sources of 264 feet would be planned, so as to achieve maximum destructive interference. The resulting equivalent delay time is 40 ms.

Figure 4:
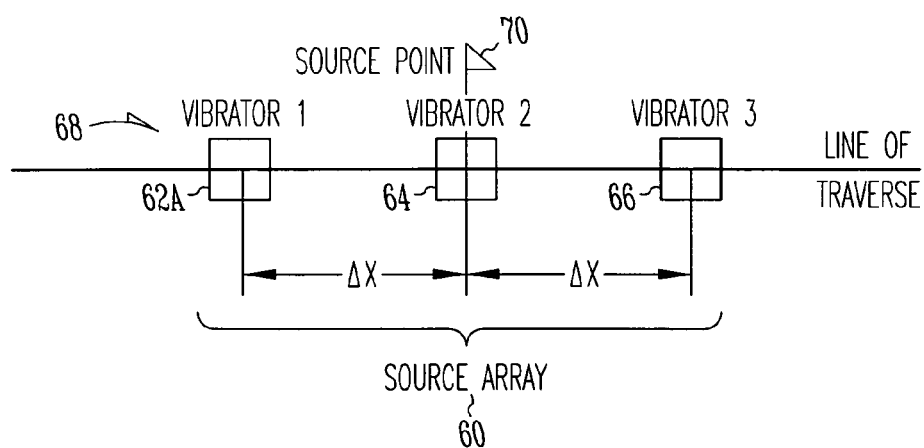
FIG. 4 schematically depicts, from a top view, an example seismic source array.

FIG. 4 depicts an example plan for the relative horizontal positions of a typical source array 60 as it would appear in the field, shown from a top or plan view. In this example, three vibratory sources 62, 64, 66 are arranged in a two-dimensional, linear pattern 68 along the seismic data acquisition shooting direction, or line of traverse. The geometric center of the array 70 is the effective collective source location or "source point." The horizontal pattern and spacing is designed to reduce the described ground roll (using the method of FIG. 2) along the direction of the traverse that would ordinarily interfere with recording of the seismic signals returning from the subsurface. As is apparent from the preceding discussion, the spacing between the individual sources ($\Delta X$) is designed to produce the maximum amount of destructive interference among the laterally traveling waves produced by the sources in the array.

As will be apparent from the discussion to follow, in preferred implementations of the present invention, the described system provides apparatus to enable real time, highly accurate, source location, such that unnecessary deviations are avoided, and unavoidable deviations are recognized, such that they may be accounted for appropriately. In preferred examples of practicing the present invention, a first step will be to enable source placement as is physically manageable in relative longitudinal placement along the survey line (the "X" direction, as discussed above); including, where needed, to correct location errors to the extent possible by relocating one or more sources via the onboard positioning system. The positioning errors can be determined in reference to a planned position. Alternatively, such planned positions may be used only as a reference, and the relative positioning of the sources may be determined directly in reference to one another.

Referring still to FIG. 4, the actual separation between the two sources in the figure is determined from their measured positions on the earth's surface via the spatial coordinates ($XS1, YS1, ZS1$) and ($XS2, YS2, ZS2$) by the relations:

$$\Delta X = (XS1 - XS2)$$

$$\Delta Y = (YS1 - YS2)$$

$$\Delta Z = (ZS1 - ZS2)$$

Where $\Delta X$, $\Delta Y$, $\Delta Z$ are the components of the source separation in the X, Y and Z directions for the sources S1 and S2, and the total straight line source separation (R) is given by:

$$R = \sqrt{(\Delta X^2) + (\Delta Y^2) + (\Delta Z^2)} \quad \text{Eq. 3}$$

Since ground roll is a wave that propagates along the earth's surface, rather than this straight line path, the correct distance measurement between the two sources of interest would be along the earth's surface following any topographic undulations. This more accurate value may be obtained by using the continuously measured elevations between sources obtained by the positioning system. The straight line approximation, however, will suffice for illustrative purposes. The total source separation value (R) may then be used with the ground roll propagation velocity (Vg) to estimate an actual equivalent delay time ($\Delta Ta$), as follows:

$$\Delta Ta = \Delta R / Vg \quad \text{Eq. 4}$$

The actual delay time ($\Delta Ta$) may then be related to the ideal delay time ($\Delta Ti$) to determine a delay time error ($\Delta Terr$) as follows:

$$\Delta Terr = \Delta Ta - \Delta Ti \quad \text{Eq. 5}$$

The delay time error represents a measure of the difference in ground roll suppressing capabilities between the actual and ideal array configurations. In practice this invention provides a means to minimize $\Delta Terr$, and to thus maximize the planned ground roll suppression capabilities of the source array.

As one example of the present invention, a vibratory source array might be planned for three sources to be placed along a line of traverse, at uniform intervals of 264 feet, in accordance with the plan concerns identified earlier herein. However, when the sources are actually positioned on the ground, the actual longitudinal spacing ($\Delta X$) between sources 1 and 2 is 244 feet, and the actual longitudinal spacing between sources 2 and 3 is 284 feet. Additionally, source 2 is placed 20 feet to a first side ($\Delta Y$) of the line of traverse; while source 3 is located 20 feet to the opposite side of the line of traverse. Further source 1 is vertically offset ($\Delta Z$) 84 feet below a horizontal plane associated with sources 2 and 3. Using the relationships described above, the actual straight-line distance between sources 1 and 2 is 258.83 feet versus the planned 264 feet. At a ground roll velocity of 6600 ft/sec the planned delay time is 40 ms and the actual delay time is 39.2 ms. This results in a delay time error of −0.8 ms. Similarly, for the pairing of sources 2 and 3 we obtain an actual distance of 284.70 feet and a delay time error of +3.1 ms. Physical repositioning of the sources in the array to place them along the same X direction with the correct spacing will repair this defect. This can be accomplished via the previously-described positioning information. Compensation for the $\Delta Z$ difference is discussed below.

Figure 5:
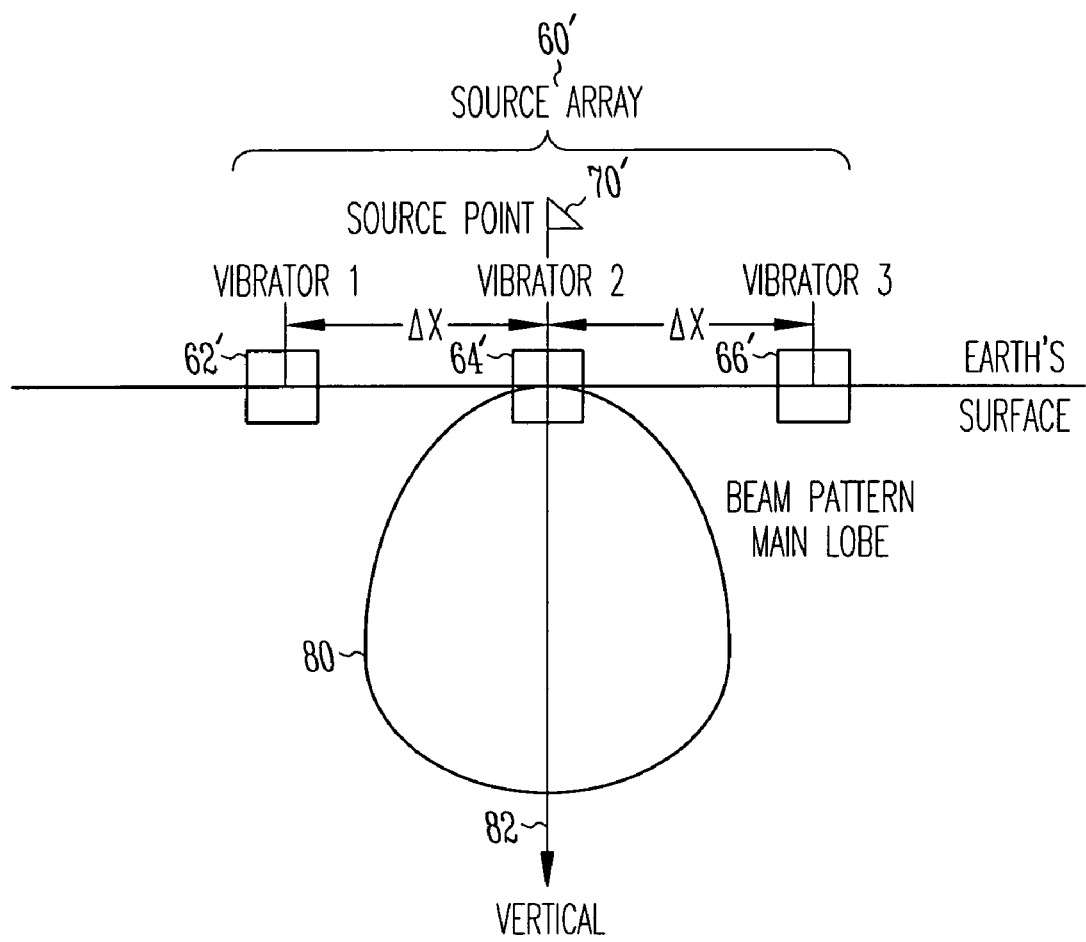
FIG. 5 depicts the directional properties of a source array-produced seismic energy pattern relative to a horizontal surface plane.

Turning now to the beam forming and pointing characteristics of the source array, FIG. 5 depicts, in idealized form, the main lobe 80 of the energy beam pattern produced by an array 60' where all the sources 62', 64', 66' lie on the same horizontal plane, and with the planned spacing (the spacing needed to optimally suppress ground roll). In this example, all sources are initiated simultaneously. The combined energy of the source array in energy lobe 80 is directed along an axis 82, generally vertically downward, directly beneath source point 70'.

Figure 6:
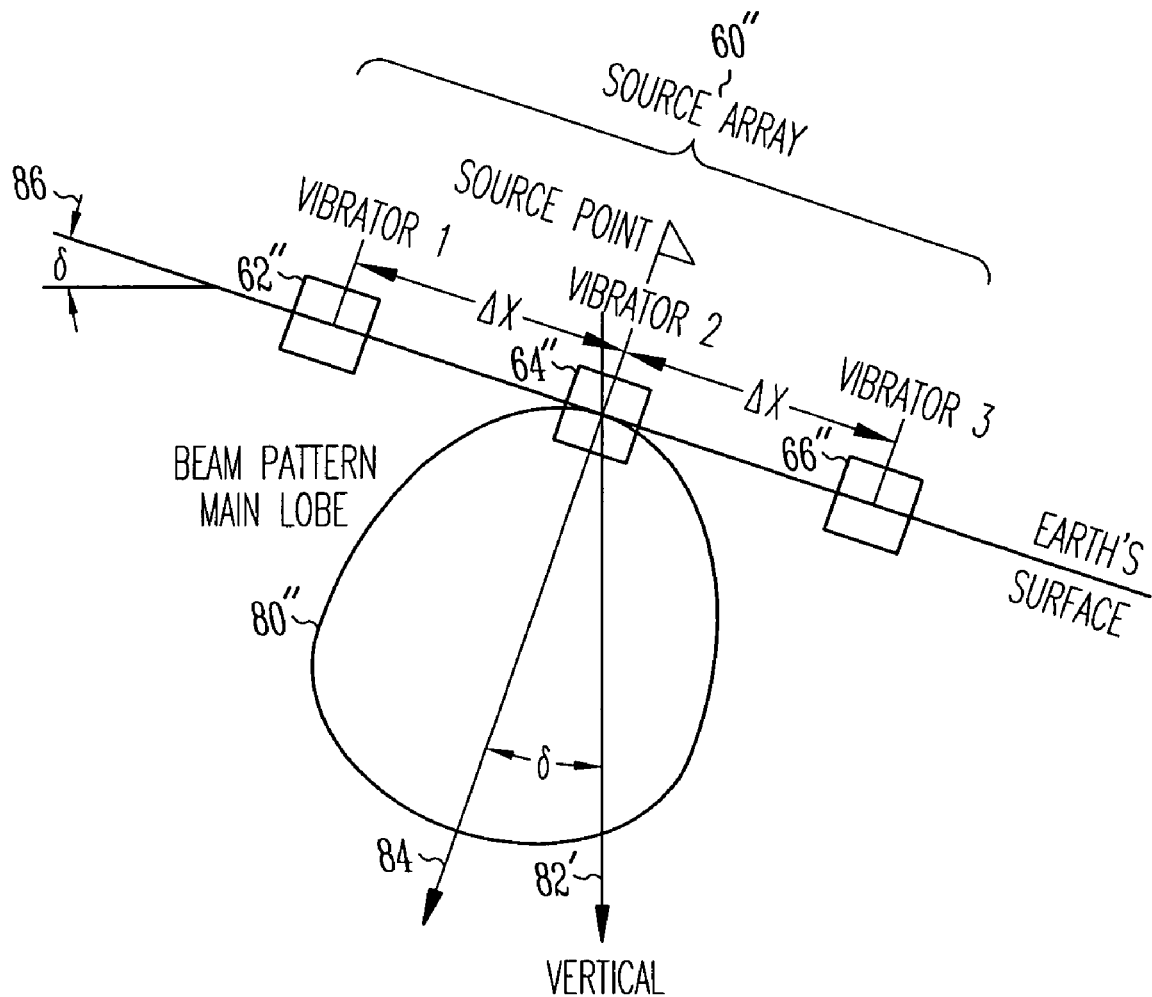
FIG. 6 depicts the directional properties of a source array-produced seismic energy pattern on a dipping surface plane.

FIG. 6 shows the same array 60" as in FIG. 5, but on a non-horizontal earth surface, such as a hillside. The main lobe 80" of the composite source energy pattern is now no longer directed along a vertically downward axis 82', but rather along an axis 84 generally perpendicular to the surface, and at an angle to the vertical equal to the dip ($\delta$) 86 of the earth's surface. For the previous example of source separation of a 264 feet, a vertical elevation difference of 84 feet between the sources will shift the beam to an angle of 18.55 degrees from the vertical in the direction of the source that is at the higher elevation. The 84 foot elevation difference corresponds to a time difference of 6 ms at 14,000 ft/sec vertical body wave propagation velocity (note that this is different from the horizontal ground roll propagation velocity of 6600 ft/sec). The introduction of a 6 ms trigger delay (with the lower elevated source triggered 6 ms later than the higher elevated source) between the two sources with an elevation difference of 84 feet would compensate for the 6 ms time difference due to the elevation difference and point the beam vertically downward. Comparing to the previous section, we see that this same relative trigger delay between the two sources could be introduced to obtain a pointing angle of 18.55 degrees if the sources were at the same elevation on a planar horizontal earth surface. In view of this equivalence, the concepts described herein for using source trigger delays may be used either for compensating for elevation offset, or for beam pointing; or as addressed herein for both objectives. This equivalence highlights the fact that elevation adjustment and beam pointing via trigger delay are two manifestations of the same effect.

One significant use of the present invention is in a situation as in FIG. 6, to redirect the main energy lobe 84, vertically downward, along axis 82', even though the sources are at different elevations with respect to a reference, such as either source elevation, or a common reference such as mean sea level. This is accomplished through the introduction of relative time delays (referred to herein as "trigger delay") between actuation of the sources. In this case, the above example of an 84 foot elevation difference is equivalent to a 6 ms relative trigger delay when the surface layer vertical velocity is 14,000 ft/sec. The methods described herein can also be used to redirect the main beam at a selected angle other than vertical, independent of elevation differences between the sources. A further use of the invention builds on this use of relative trigger delays produced through an analysis similar to the above to re-direct the main beam at a pre-selected angle regardless of whether the sources are at the same elevation or not.

If lateral errors ($\Delta X$ and $\Delta Y$) are satisfactorily handled by the positioning system, a comprehensive surface position correction may be achieved along with survey operator control of the beam pointing. In preferred implementations of the invention, the described dynamic positioning system and techniques using GPS telemetry will be used to get the sources into their planned spacing. Ideally this will be at the planned X, Y positions. However, if this is not possible, such as due to obstructions, the source array may be displaced until it is possible to place them the correct distance apart along a line parallel to the intended line of traverse at other nearby X, Y locations. The guiding principal is to maintain the correct source spacing and the directional sense of the array. Once the array placement on the ground is defined, then in preferred examples of the inventive methods, an operator will determine the time delay needed to compensate for vertical elevation differences and to achieve any desired beam pointing objectives that are intended, or warranted in view of the actual placement on the ground. Then the operator would proceed to calculate the trigger delay needed to meet the beam pointing objectives and simultaneously compensate for any vertical source-to-source elevation difference that may be present.

In some circumstances the configuration of subsurface interfaces is not known, or is only known in a general fashion, and little can be determined about the directions along which the interfaces will reflect the source energy. In these cases the preferred practice would be to provide subsurface illumination by the source array in as many directions as practical to assure that some source beam directions will produce sufficient reflection energy from the subsurface interfaces at the receivers. The following exemplary descriptions demonstrate how this may be achieved for two dimensional, linear surveys and three dimensional aerial surveys on a plane horizontal earth surface. Extension to non-horizontal earth surfaces can be achieved via the principals covered above. For instances where more complete knowledge of the subsurface interfaces is available, dominant reflection energy directions can be predetermined by someone practiced in the art and the preferred source beam pointing directions can be calculated via the principles outlined above to identify those source beam directions needed to produce optimal recording results at the detectors.

Figure 7:
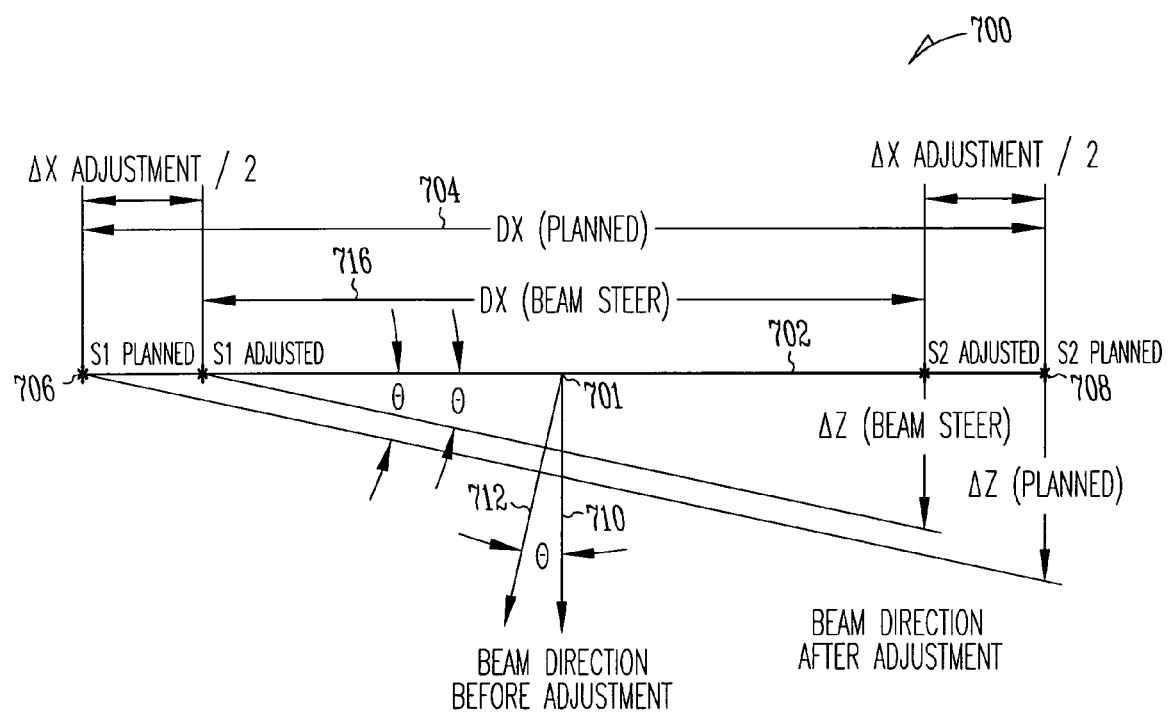
FIG. 7 depicts the geometric relationships for active beam pointing on a planar horizontal surface.

FIG. 7 illustrates the key geometric relationships for beam steering on a plane horizontal surface for a two dimensional survey—a survey in which the sources and receivers are deployed along a common line on the earth's surface.

In the schematic representation of FIG. 7, therein is depicted a source array 700 extending from a source group location 701 on a generally horizontal planar surface 702 representative of the earth surface. A planned source array spacing ("$\Delta X$ (planned)") 704 between the placement of a first source (S1) 706, and a second source (S2) 708 is represented. In accordance with the discussion earlier herein, it will be appreciated that simultaneous actuation of first source 706 and the second source 708 will cause the primary energy lobe (as represented in FIG. 6), to propagate generally along axis 710 which extends downwardly from, and generally perpendicularly to, the surface 702. Thus, the energy will be directed primarily to the formations directly below the source array 700. However, through use of the principles as described herein, the energy may be directed downwardly at an angular offset to perpendicular axis 710, for example, along axis 712.

From the relationships in FIG. 7 we see that:

$$\Delta T(\text{planned}) = \Delta X(\text{planned})/Vsw \qquad \text{Eq. 6}$$

$$= \Delta X(\text{beam steer})/Vsw \pm$$

$$\Delta Z(\text{beam steer})/Vbw)$$

and $$\Delta Z(\text{beam steer})/\Delta X(\text{beam steer}) = \tan\theta. \qquad \text{Eq. 7}$$

Where:
$\Delta X$(planned) 704 is the designed optimal ground roll suppression source to source separation;
$\Delta T$(planned) is the designed optimal ground roll suppression equivalent delay time;
Vsw is the surface wave (ground roll) propagation velocity; and
Vbw is the vertical body wave propagation velocity.

$\Delta X$(beam steer) and $\Delta Z$(beam steer) are the unknowns and can be obtained from the above two equations. $\Delta Z$(beam steer) divided by Vbw is the source-to-source trigger delay needed to accomplish the desired beam pointing; and $\Delta X$(beam steer) 716 is a new source-to-source spacing. The difference between $\Delta X$(beam steer) and $\Delta X$(planned) is a source spacing adjustment that must be used in combination with the source trigger delay. The source-to-source spacing adjustment causes a reduction in the source-to-source delay time as it applies to ground roll suppression. Any change in source-to-source separation distance from the ideal destructive interference distance creates a change in the equivalent delay time and therefore causes deterioration in the ground roll suppressing capabilities of the source array. From the point of view of the ground roll suppression delay time, the trigger delay is added or subtracted from it depending on which of the two sources is trigger-delayed with respect to the other and on the direction of ground roll travel across the source array. The source spacing adjustment is calculated to match the resulting incremental delay time introduced by the trigger delay and to thereby restore the full ground roll suppressing capabilities of the source array.

There are two possible solutions to the above set of equations (only one of which is depicted in FIG. 7):

$$\Delta X(\text{beam steer}) = \Delta T(\text{planned})/((1.0/Vsw) \pm (\tan\delta/Vbw)) \qquad \text{Eq. 8}$$

In the case of the positive sign in the last term above, the spacing adjustment moves the sources apart and optimal ground roll suppression is maintained toward the right (but not the left) in FIG. 7. For the negative sign, the spacing adjustment moves the sources toward each other and optimal ground roll suppression is maintained toward the left (but not the right) in FIG. 7. This means that only one side of the receiver array can be recorded for a particular combination of trigger delay and source-to-source spacing adjustment. For a beam steering pointing angle equal to the dip angle of FIG. 6 (18.55 degrees) the first solution gives a new source-to-source separation of 227.9 feet. A trigger delay of 5.5 ms between the two sources (the source away from the beam steer direction being triggered first) would be used and the left-hand side of the receiver array would be recorded. The second solution (as depicted) gives a new source-to-source separation of 313.6 feet. In this case, a trigger delay of 7.5 ms between the two sources would be used and the right-hand side of the receiver array would be recorded. In both cases, the combination of the new separation distance and the source-to-source trigger delay results in the desired 40 ms equivalent delay time needed for optimal ground roll suppression. It should be noted that two different source separations were needed to record the two halves of the receiver array. To beam steer in the opposite direction (−18.55 degrees) the above exemplary source separations and time delays would be reversed. This set of recordings forms a complimentary pair with those of the +18.55 degree direction. The full receiver array can be recorded for the two directions with a total of two source spacings and two sets of time delays. This concept is covered in more detail immediately below.

Figure 8A:
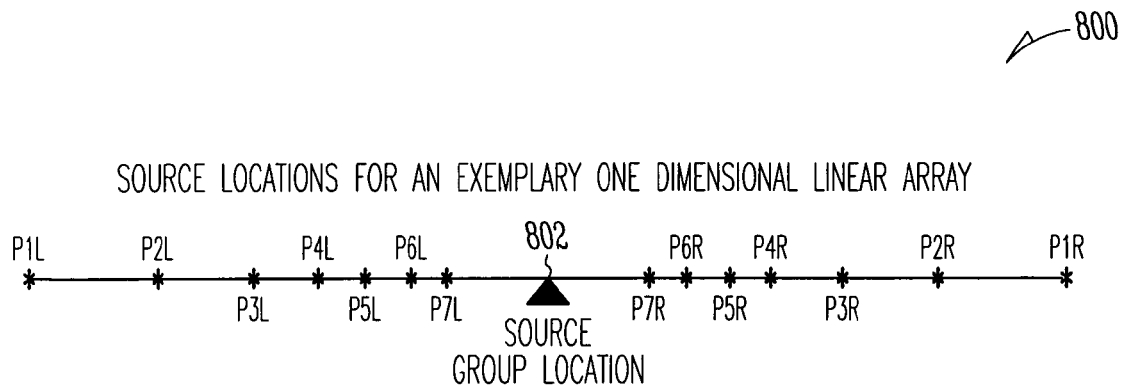
FIGS. 8A-B depict the source positions for an exemplary one-dimensional linear source array as it would be employed in order to direct the beam in a series of pointing directions.
Figure 8B:
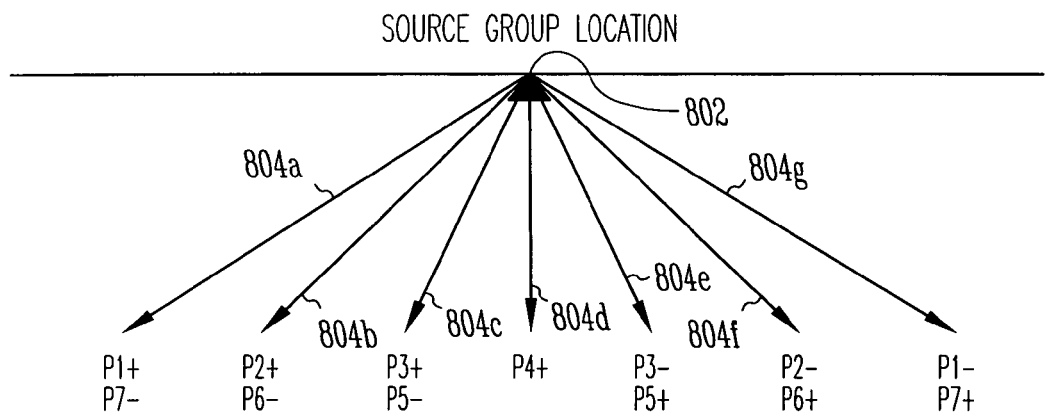

Referring now also to FIGS. 8A-B, therein is depicted in FIG. 8A a representation 800 of source locations relative to a group source location 802, as determined based on the spacing needed for optimal ground roll suppression and the desired beam pointing calculations presented in Eq. 8. In practice, field use of the beam steering principles discussed above in reference to FIGS. 5-7 would involve a series of source moves relative to a common center point (the source group location) 802. The source positioning pattern produces a series of beam pointing directions, shown in FIG. 8B. The series of beam pointing angles 804a-g begins with some maximum positive angle 804a, continues to the zero angle (vertically downward) 804d and through to some maximum negative angle 804g (usually, but not necessarily, the same absolute value as the maximum positive angle). The series of beam angles is designed to provide source energy propagation over a wide range of angles to assure that at least some will produce significant reflection energy at the detectors from an unknown configuration of subsurface interfaces. At the same time, the surface wave suppressing properties of the source array are maintained.

In FIG. 8A all source pairs (one pair forms the source array) are designated by the letter P followed by the pair number; the two sources (L and R) in a pair have the same pair number. For the most efficient operation in the field, the two sources of the pair would be positioned initially at either the two most outward (P1L and P1R, where L and R indicate the left and right source locations with respect to the source group location) or inward (P7L and P7R) locations in FIG. 8A. The two sources (R and L) would be initiated with the appropriate trigger delay to accomplish the desired beam pointing, first for the maximum positive angle (path 804a) while recording one side of the receiver spread (designated the "+" side), and then for the maximum negative angle (path 804g) while recording the other side of the receiver spread (designated the "−" side). A single source pair therefore only produces half the recordings for each of two pointing directions. In the case of the P1 pair it would be the right side of the receiver array for the 804a beam direction and the left side of the array for the 804g direction. A different source pair, in this case P7, will produce the complimentary recordings, the left side of the receiver array for path 804a and the right side of the receiver array for path 804g. In a like manner the P2, P6 source pairs, and P3, P5 source pairs are complimentary and produce recordings for the 804b, 804f and 804c, 804e beam directions respectively. The P4 source pair is its own compliment since no beam steering time delay is needed for the vertical direction and both sides of the receiver array can be recorded simultaneously. This pairing of long and short source spacings is due to the time delay being introduced to accomplish the beam pointing acting in concert with the source to source time delay needed for ground roll suppression. The data will have to be reorganized after recording and prior to processing.

The sources are then moved to the next-adjacent set of locations, inward or outward, and triggered in a like manner. This is repeated until all source positions for the source group location have been done and all beam angles in the series have been produced. The entire procedure is then repeated for all subsequent source group locations. As is common in current practice, multiple source frequency sweeps can be employed at each location for each trigger delay and beam direction to increase total recorded energy. In addition, more than one physical source can be deployed at a given group source position so long as the same number of physical sources is used at all such locations.

The special case of the P4 source pair should be noted in more detail. This pair produces the vertical beam. The source-to-source separation for this pair is the ideal or designed distance. No trigger delay is required since the beam is not steered and the source array is disposed on a horizontal surface in this case; it naturally propagates vertically downward in the direction perpendicular to the earth's surface. Both sides of the receiver spread can be recorded at the same time since no source-to-source trigger delay is required.

Figure 9:
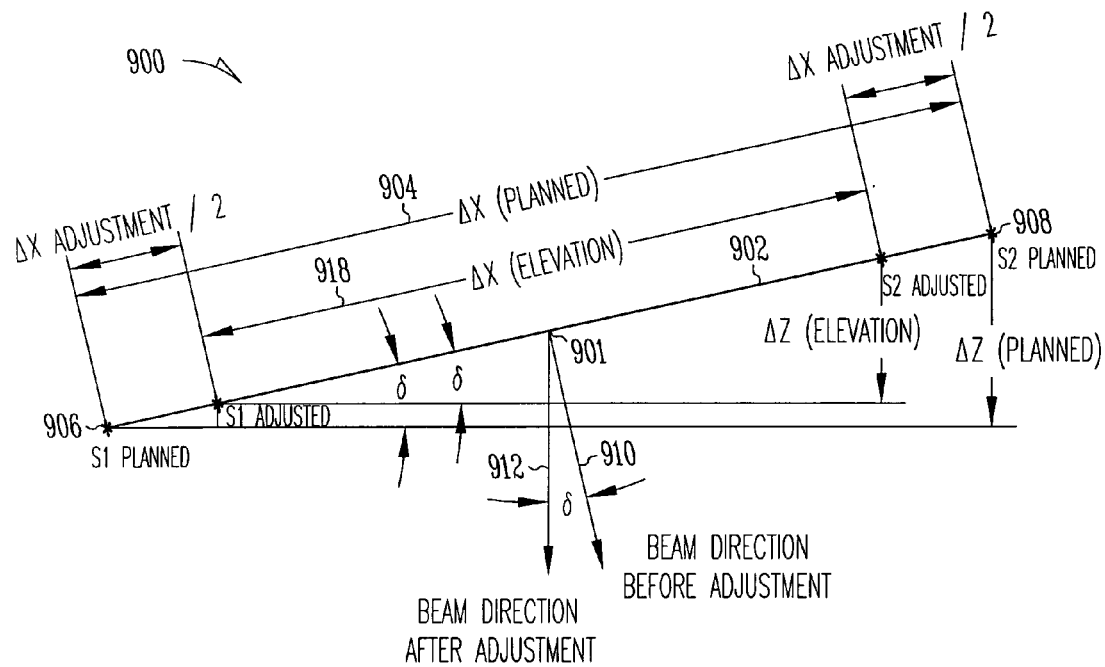
FIG. 9 depicts the geometric relationships for beam direction pointing adjustment due to source-to-source elevation differences on a planar dipping surface.

Referring now to FIG. 9, therein is illustrated the key geometric relationships for beam pointing adjustment on a uniformly dipping slope for a two dimensional survey, a survey in which the sources and receivers are deployed along a common line on the earth's surface. FIG. 9 depicts a source array 900 extending from a source group location 901 on an inclined planar surface 902 representative of the earth surface. A planned source array spacing ("ΔX (planned)") 904 between the placement of a first source (S1) 906, and a second source (S2) 908 is represented. In accordance with the discussion earlier herein, it will be appreciated that simultaneous actuation of first source 906 and the second source 908 will cause the primary energy lobe (as represented in FIG. 6), to propagate generally along axis 910 which extends downwardly from, and generally perpendicularly to, the surface 902. Thus, the energy will not be directed to the formations directly below the source array 900. However, through use of the principles as described herein, the main energy lobe or beam may be directed directly vertically downwardly, for example, along axis 912.

The process of calculating the correct trigger delay needed to steer the beam in the vertical direction when the sources are at two different elevations must take into account the fact that any trigger delay introduced to compensate for a source-to-source elevation difference will also impact the source-to-source ground roll suppression delay time in the same manner as in the described example of beam steering discussed in reference to FIG. 7. In order for the trigger delay correction to be successful, the source-to-source distance separation must be adjusted by an amount equal to the trigger delay needed to compensate for the elevation difference.

From the geometric relationships depicted in FIG. 9, the following relationships may be seen:

$$\Delta T(\text{planned}) = \Delta X(\text{planned})/V_{SW} \quad \text{Eq. 9}$$
$$= \Delta X(\text{elevation})/V_{SW} \pm$$
$$\Delta Z(\text{elevation})/V_{bw})$$

and $$\Delta Z(\text{elevation})/\Delta X(\text{elevation}) = \sin \delta.$$

Where:
ΔX(planned) 904 is the designed optimal ground roll suppression source separation;
ΔT(planned) is the designed optimal ground roll suppression equivalent delay time;
Vsw is the surface wave (ground roll) propagation velocity; and
Vbw is the (vertical) body wave propagation velocity.

In a manner analogous to the prior example of FIG. 7, ΔX(elevation) 918 and ΔZ(elevation) 920 can be obtained from the above two equations. ΔX(elevation) 918 determines the amount that the source spacing must be changed, while ΔZ(elevation) 920 divided by Vbw sets the source-to-source trigger delay. As before, there are two possible solutions to the above set of equations:

$$\Delta X(\text{elevation}) = \Delta T(\text{planned})/((1.0/V_{SW}) \pm (\sin \delta/V_{bw})) \quad \text{Eq. 10}$$

The first solution (as depicted in FIG. 9) gives a new source-to-source separation of 229.6 feet with a source-to-source elevation difference of 73.0 feet. A trigger delay of 5.2 ms between the two sources (the up slope source being triggered first) would be used. The second solution (not depicted) gives a new source-to-source separation of 310.6 feet with a-source-to-source elevation difference of 98.8 feet. In this case, a trigger delay of 7.1 ms between the two sources would be used. In both case the combination of the new separation distance and the source-to-source trigger delay results in the desired 40 ms delay time needed for optimal ground roll suppression. One of the solutions applies to surface waves propagating in one direction along the line defined by the source locations while the other solution applies to the opposite direction along the same line. Just as in the beam pointing case on a horizontal surface, two solutions result because it is not possible to redirect the beam and maintain the proper surface wave suppressing capabilities of the source array simultaneously in both directions away from the source group location. This means that the receivers along the line formed by the sources (which form the receiver "spread") positioned on opposite sides of the source group location must be recorded separately with two different source to source time delays. It also means, as before, that the two halves of the receiver spread for a given source pair actually represent two different pointing directions. This was depicted in FIG. 8B and discussed above. A second pair of sources will produce the complimentary set of pointing direction and receiver spread halves. Again, the data will have to be reorganized after recording and prior to processing.

Figure 10:
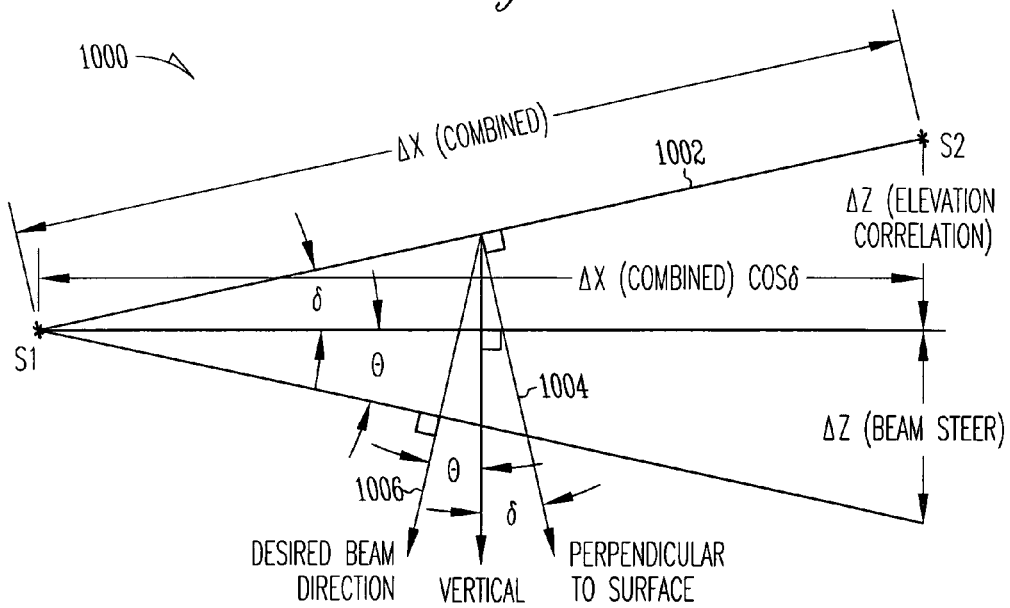
FIG. 10 schematically depicts the geometric relationships for combined beam direction elevation adjustment and active beam pointing on a planar dipping surface.

Referring now to FIG. 10, therein are shown the geometric relationships for combined beam direction elevation adjustment and active beam pointing relative to a source array 1000 disposed on a planar dipping surface 1002. From the relationships in FIG. 10 we see that:

$$\Delta T(\text{planned}) = \Delta X(\text{planned})/V_{SW} \quad \text{Eq. 11}$$
$$= (\Delta X \text{ combined}/V_{SW}) \pm$$
$$(\Delta Z \text{ elevation})(\sin\delta/V_{bw}) \pm$$
$$(\Delta Z \text{ beam steer})(\cos\delta)(\tan\theta)/V_{bw}$$

where $$\Delta Z(\text{elevation})/\Delta X(\text{combined}) = \sin\delta, \quad \text{Eq. 12}$$

and $$\Delta Z(\text{beam steer})/\Delta X(\text{combined}) = \cos\delta\tan\theta \quad \text{Eq. 13}$$

As may be seen from the relationships below, these equations have four possible solutions:

$$\Delta X(\text{combined}) = \quad \text{Eq. 14}$$
$$\Delta T(\text{planned})/((1.0/V_{SW}) \pm (\sin\delta/V_{bw}) \pm (\cos\delta\tan\theta/V_{bw}))$$

The two solutions governed by the first ± sign again relate to the surface wave propagation direction along the line formed by the two sources and these solutions are applied as before. The two solutions governed by the second ± sign turn out to be redundant with changes in the beam direction since $\tan(-\theta) = -\tan\theta$. Therefore, for each combination of surface dip, $\delta$, and beam pointing direction, $\theta$, there are, again, two source-to-source distance adjustments, one for each propagation direction along the source array line of the surface 1002. Consistent with the previous solutions, the two sides of the receiver spread must be recorded separately.

Real-world conditions are not as ideal as those depicted herein to illustrate the invention to those skilled in the art. The case of non-uniformly dipping and possibly undulating slopes between two sources may be addressed by a modified approach, based on the principles described herein. In general, the preferred approach would be to use the above methods and available topographic data from the positioning system to directly calculate a set of solutions for some number of relatively closely-spaced points on the surface downhill and uphill from the planned source locations; and then utilizing the possible solutions that best fit the planned source-to-source delay time.

Figure 11A:
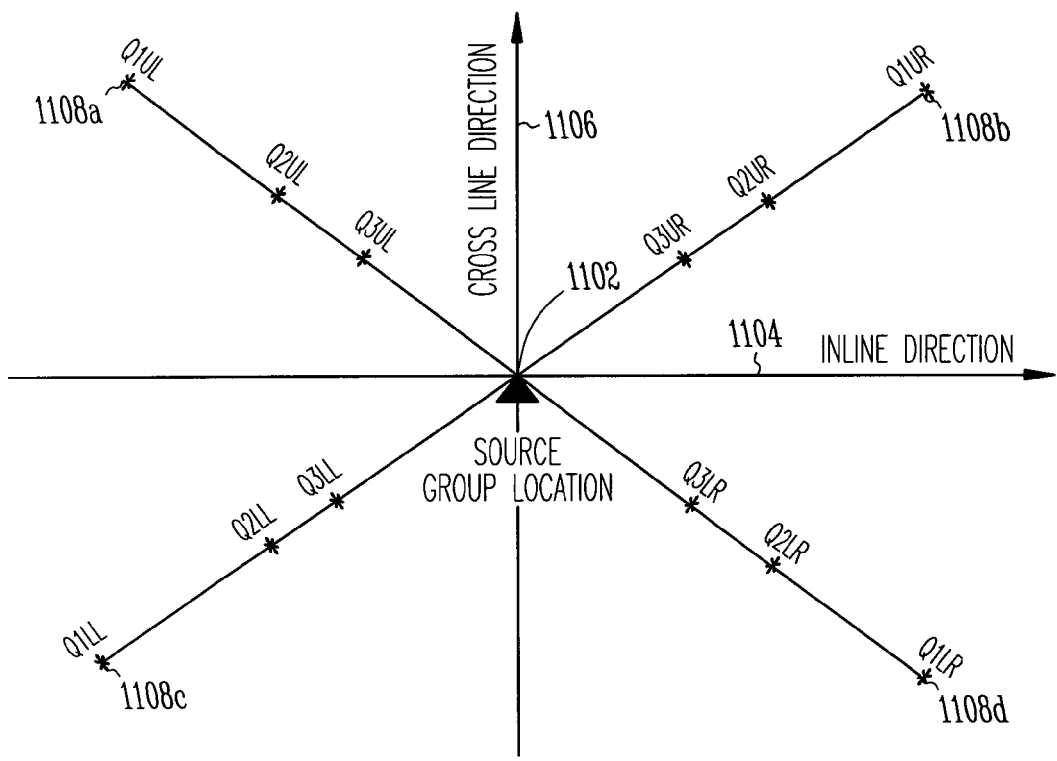
FIGS. 11A-B depict the source positions for an exemplary two dimensional aerial source array as it would be employed to direct the beam in a series of pointing directions.
Figure 11B:
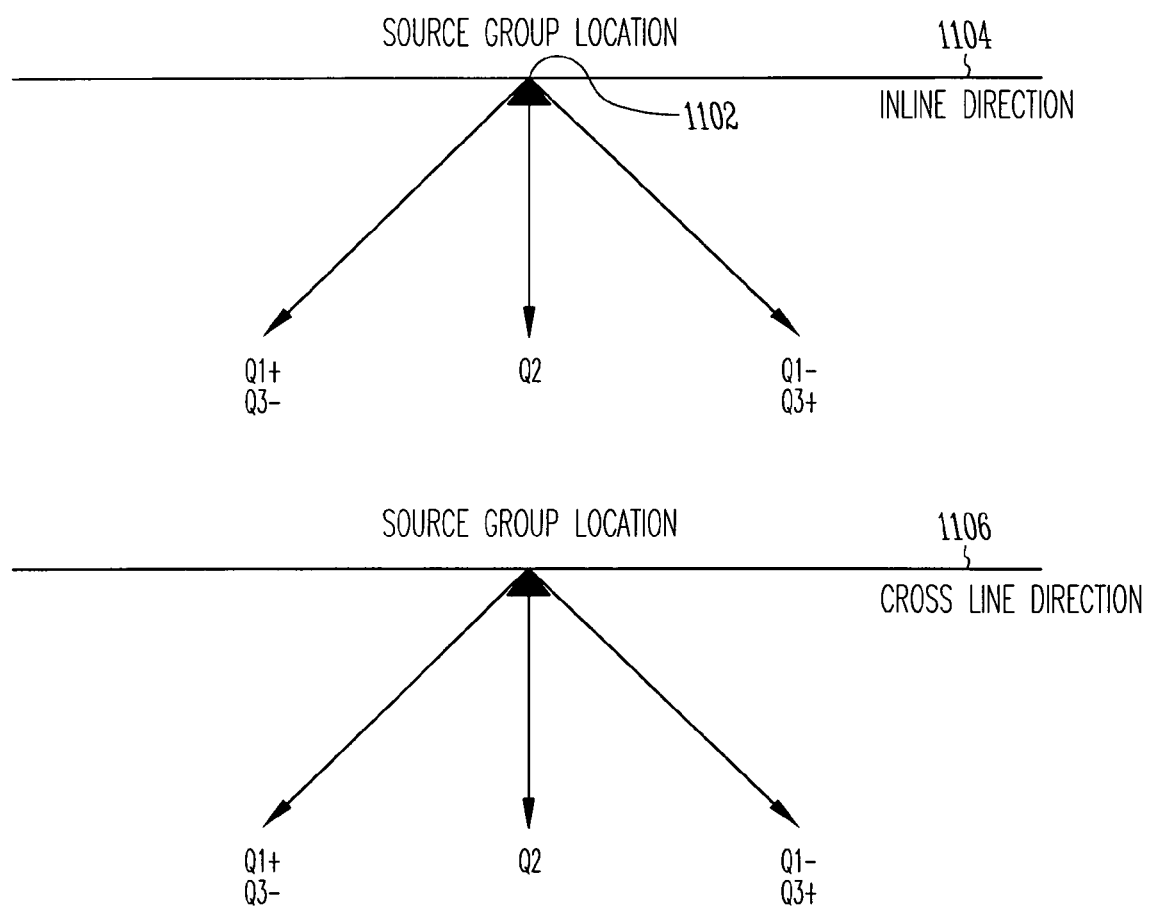

In addition to application of the principles herein to single dimension or linear arrays, as discussed in reference to FIGS. 11A-B, the present invention may also be applied to two-dimensional surveys, wherein the sources and receivers are deployed aerially on the earth's surface. This application may be achieved by those skilled in the art through extension of the principals discussed above. FIG. 11A depicts a two dimensional source array 1100, having example sources for an array of four sources, relative to a source group location 1102. In this case, the beam directions would vary in both the inline 1104 and cross line 1106 directions, according to the same principles set out above. For reasons of field operations efficiency, the four sources (a source quad, Q) 1108a-d of the array would be positioned initially at either the two most inward (Q3LL, Q3LR, Q3UR and Q3UL) or outward (Q1LL, Q1LR, QIUR and Q1UL) locations in FIG. 11A. Referring to FIG. 11B, the four sources 1108a-d would be triggered with the appropriate delays to accomplish the desired beam pointing (and elevation compensation in the added case of a non-horizontal earth surface). For example, first the maximum positive inline angle 1106a (Q1+, Q3−0) would be done while recording the left side of the receiver spread in the inline direction (all receivers lying to the left of the cross line direction indicator in FIG. 11A), then the maximum negative inline angle 1106c (Q1−, Q3+) while recording the right side of the inline receiver spread. This would be followed by the maximum positive cross line angle 1106d (Q1+, Q3−) while recording the bottom part of the receiver spread in the cross line direction (all receivers below the inline direction indicator in FIG. 11A), then the maximum negative cross line angle 1106f (Q1−, Q3+) while recording the upper side of the cross line receiver spread. As in the two dimension case described above, pairs of sources will produce complimentary sets of pointing direction and receiver spread halves. Again, the data will have to be reorganized after recording and prior to processing.

The sources would then be moved to the next-adjacent inward or outward set of locations and triggered in a like manner. This is repeated until all source positions for the source group location have been done. The entire procedure is then repeated for all subsequent source group locations. As is common in current practice, multiple source sweeps can be employed at each location for each trigger delay and beam direction to increase total recorded energy. In addition, more than one physical source can be deployed at a given source position so long as the same number of physical sources is used at all locations.

The present invention also facilitates the monitoring of surface wave velocity and dominant frequency, and facilitates using the positioning data to adjust the physical source locations to accommodate needed changes in source spacing to maintain optimal suppression of horizontally traveling noise. As will be apparent to those skilled in the art, and as can be seen from equation 1, changes in either the velocity of propagation or dominant frequency (due to variations of the physical parameters of the local surface geology) of the ground roll will affect the noise canceling properties of the array.

In current practice, the array is designed and the spacing between sources in the array is fixed before the survey is begun. This is done by employing whatever existing information about the survey area is available. Field records from a previous survey in the area or from field tests conducted at the start of a new survey are typically used to measure surface wave velocity and frequency. In current practice, once the surface wave velocity and dominant frequency have been established for a survey area, and the source and receiver arrays have been designed, they are generally not changed during the course of the survey.

In some areas, however, surface rock properties that govern the surface wave velocity and dominant frequency can change significantly. In these cases, it may be advantageous to alter the source array design as the survey progresses. In accordance with the present invention, the slope of the surface wave arrival times can be measured as it progresses across the receivers on the field record (defined as the recordings of all receiver stations active for a given source station), and the velocity determined by:

$$V = \Delta Xr/\Delta Tr \qquad \text{Eq. 15}$$

Where $\Delta Tr$ is the surface wave arrival time difference on the field record between receiver stations spaced a distance $\Delta Xr$ apart on the ground and V is the resulting surface wave propagation velocity. The dominate frequency, F, of the surface wave can be obtained from a measurement of the period of the ground roll as seen on the field record. The time, Tsw, between two successive peaks or troughs of the surface wave is measured and the frequency, Fsw, is obtained from:

$$Fsw = 1.0/Tsw \qquad \text{Eq. 16}$$

Constant monitoring of the surface wave parameters V and F on the field records allows adjustments due to changes in V and F. From the above we have the relationship between the desired source separation, $\Delta X$, and the surface wave dominant frequency and velocity:

$$\Delta X = V/F \qquad \text{Eq. 17}$$

If either V or F or both changes, a new $\Delta X$ may result (it is possible that V and F can change in such a way as to not alter $\Delta X$):

$$\Delta Xnew = Vnew/Fnew \qquad \text{Eq. 18}$$

and hence a new ideal delay time:

$$\Delta Ti\ new = \Delta Xnew/Vnew \qquad \text{Eq. 19}$$

As will be appreciated from a review of the above description, the controlling of the positioning of the sources, as well as the determinations of changes in source spacing and trigger delays require geometric and/or mathematical evaluation of the source array, as it is placed at the survey area. In preferred examples of practicing the methods described herein, the determinations and evaluations will be performed through use of a processing system, such as an appropriately programmed computer, as discussed below in relation to FIG. 14. The instructions will preferably be encoded into a machine readable medium, such that the instructions, when executed by a machine, such as a computer or other processing system, will perform the appropriate determinations and evaluations, such as the examples described above.

Figure 12:
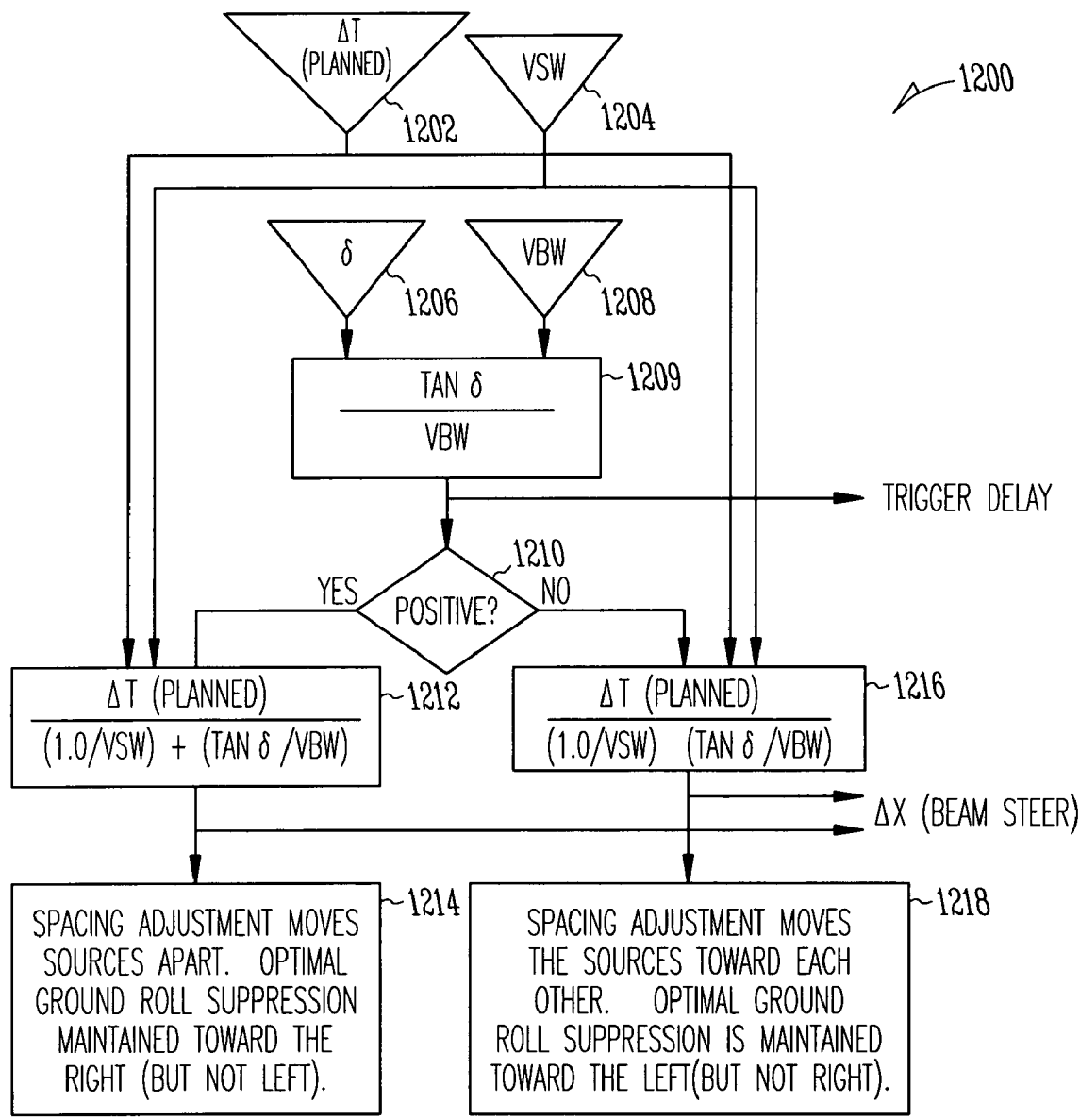
FIG. 12 depicts an example algorithm flowchart illustrating one example of a suitable process for determining spacing adjustment for adjusting source spacing to achieve beam steering.

Referring now to FIG. 12, there is depicted a flow chart for one example of an algorithm suitable for the implementation of beam steering, as discussed in reference to FIG. 7. In the example 1200, inputs are provided for the identified variables, primarily based on the planned spacing to achieve optimal ground roll suppression, specifically, the variables $\Delta T$ 1202, Vsw 1204, $\delta$ 1206 and Vbw 1208. Tangent $\delta$ is divided by Vbw at 1208, and although previously known in most cases, this will determine the polarity of the planned time delay $\Delta T$. If the polarity is determined at 1210 to be positive, then the calculation of equation 8 is performed at step 1212, using an additive relation between the terms (1.0/Vsw) and (tan $\delta$/Vbw). As a result, a value for $\Delta X$ will determined by such step, with the result that the spacing adjustment will move the sources farther apart, and optimal ground roll will be achieved only toward the right side of the array, as indicated at 1214. By contrast, if the polarity is determined at 1210 to be negative, then the calculation of equation 8 is performed at step 1216 using a subtractive relation between the terms (1.0/Vsw) and (tan $\delta$/Vbw). As a result, a value for $\Delta X$ will determined by such step, with the result that the spacing adjustment will move the sources toward one another, and optimal ground roll will be achieved only toward the left side of the array, as indicated at 1218. As will be appreciated by those having the benefit of the present disclosure, the above algorithm and process may be readily adapted to the method for elevation compensation as described in reference to FIG. 9, as well as the method for beam steering as well as compensating for elevation differences, as described in reference to FIG. 10.

Figure 13:
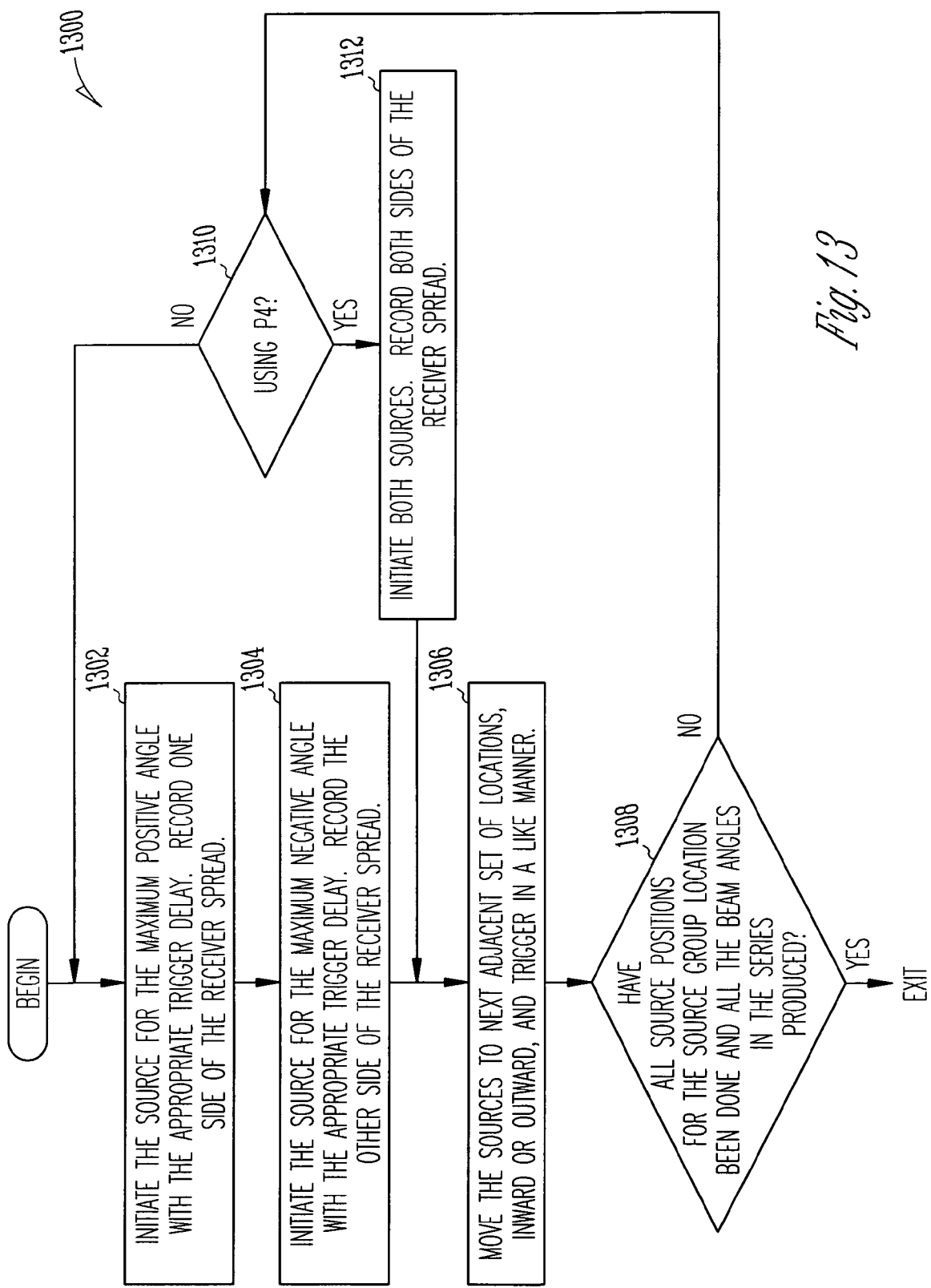
FIG. 13 depicts an example algorithm in a flowchart illustrating one example of a suitable process for performing a seismic survey of an area utilizing beam steering as described herein.

Referring now to FIG. 13, therein is depicted in flow chart form a process flow 1300 for using the above-described beam steering principles. In process flow 1300, the process will start with the determination of maximum beam steering angles and with other, interim source spacings and locations, determined in accordance with the methods described earlier herein. Process flow 1300 starts then with initiating the source for one polarity of the maximum beam steering angle, in this example the maximum positive angle, at step 1302. In this circumstance, signals will only be recorded for the left side of the receiver array, the side of the received array extending to the side of the source group location direction in which the beam is steered. Next, at 1304, the opposite maximum beam steering angle source will be actuated, with receiver signals recorded only from the opposite side of the receiver array. Next, the sources are moved to the next adjacent sets of locations, at 1306. In this example, the source locations will preferably move relatively toward one another, and will again be individually triggered, with signals recorded by only one segment, for example one-half, of the receiver array. This process will continue, as determined at 1308 until all positions for the source group have been used, and each of the steered beam angles produced. After each non-final pair of source firings, the determination will be made if the next shot point is one with no steering, as represented in FIG. 8 by P4. Where the determination is made at 1310 that the next shot point is the central, or neutral steering point, then the shots may be fired simultaneously, and the signals recorded from the entire receiver array, as at block 1312.

Figure 14:
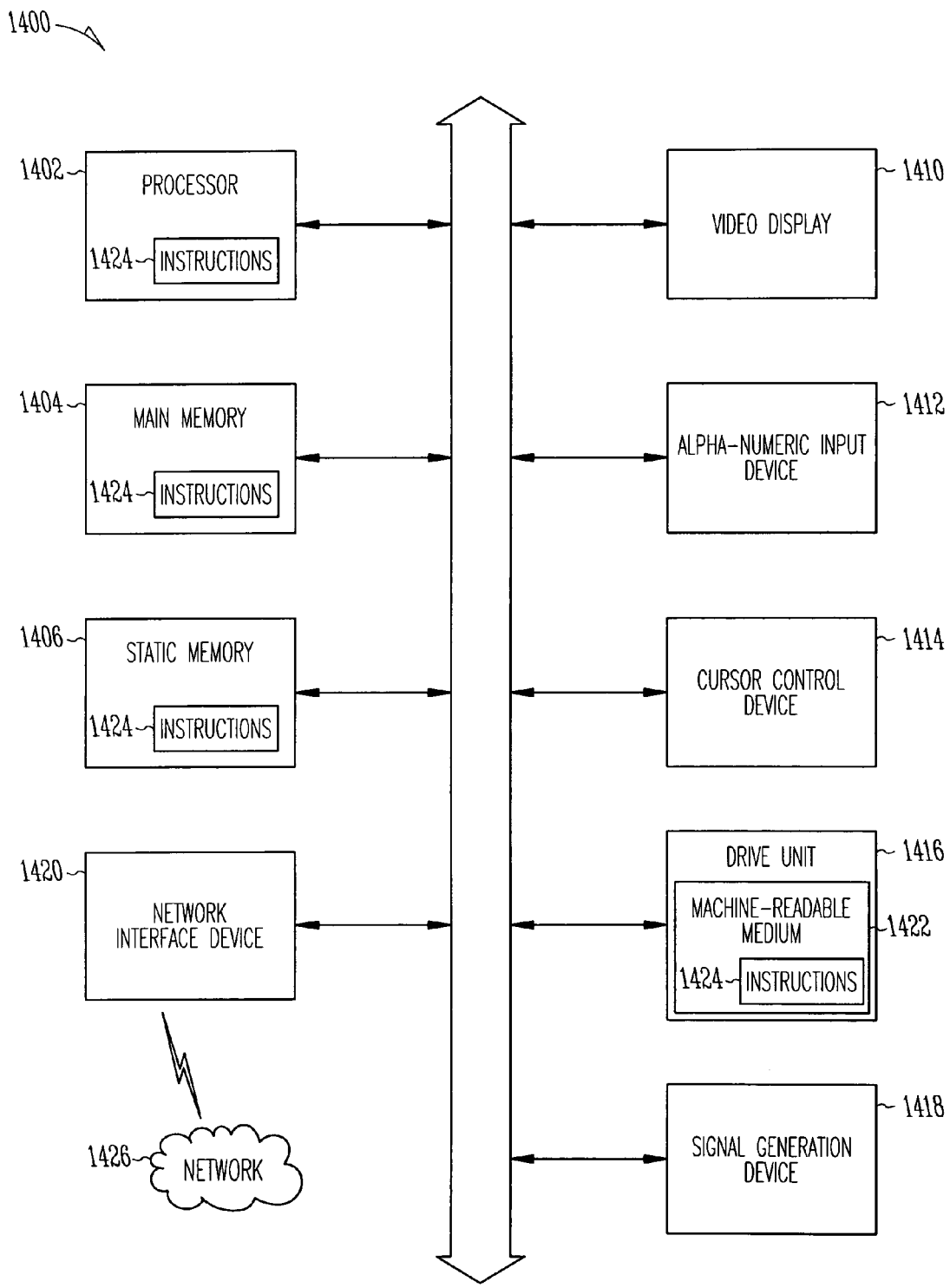
FIG. 14 depicts an exemplary processing system as may be used to make the determinations as described herein.

Referring now to FIG. 14, therein is depicted in block diagram form, an example of a processing system 1400 as may be used, for example, to perform at least a portion of the functionality of system configuration and control computer 42. Associated with processing system 1400 will be a set of instructions that may be executed to cause the machine to perform any of the functionality discussed herein. The machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, or any other machine capable of executing a set of instructions (sequential or otherwise) that specify operations to be taken by that machine. Further, while only a single machine is illustrated, the term "machine" shall also be taken to include any collection of machines that individually or jointly execute a set (or multiple sets) of instructions to perform any one or more of the steps or more complex operations discussed herein.

The example processing system 1400 includes one or more processors 1402 (e.g., a central processing unit (CPU) a graphics processing unit (GPU) or both), a main memory 1404 and a static memory 1406, which communicate with each other via a bus 1408. The processing system 1400 may further include a video display unit 1410 (e.g., a liquid crystal display (LCD), thin film transistor display (TFT) or a cathode ray tube (CRT)). The processing system 1400 also preferably includes an alphanumeric input device 1412 (e.g., a keyboard), a cursor control device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions (e.g., software 1424) embodying any one or more of the methodologies or functions described herein. The software 1424 may also reside, completely or at least partially, within the main memory 1404 and/or within the processor 1402 during execution thereof by processing system 1400; thus the main memory 1404 and the processor 1402 also constitute machine-readable media.

The software 1424 may further be transmitted or received over a network 104 via the network interface device 1420. It should be readily understood that the above elements of a processing system may not be found in all examples of processing systems that may be used in performing steps of the present invention. By way of example only, it is not essential that every processing system have a disk drive, so long as it has a memory or other means to store and/or access a store of machine-readable instructions for performing desired operations. And of course, operations which may be performed in software might also be performed through hardware or firmware implementations.

As is apparent from the discussion herein, many modifications and variations may be made from the specific examples of systems and methods for performing seismic exploration operations, as described and illustrated herein, without departing from the spirit and scope of the present invention. Accordingly, the scope of the present invention is defined by the following claims, and by all equivalents thereof.

We claim:

1. A method of land-based seismic exploration, comprising the acts of:
   positioning a plurality of vibratory seismic sources in a source array at the earth surface, the plurality of vibratory seismic sources including first and second vibratory seismic sources;
   establishing the relative locations of said first and second vibratory seismic sources in reference to a desired energy beam propagation axis;
   positioning a plurality of seismic receivers in a receiver array proximate the earth surface;
   determining first and second initiation times for said plurality of seismic sources in reference to the established positioning of said first and second seismic sources, wherein a first seismic source is initiated at a first initiation time, and a second seismic source is initiated at a second initiation time;
   initiating said plurality of vibratory seismic sources, where the initiation of said first and second seismic sources results in the creation of an energy beam propagating along an axis, and wherein the difference between said first and second initiation times is determined in a reference to the desired angular offset of said energy propagation axis relative to an axis extending generally perpendicular to the earth's surface supporting said first and second seismic sources; and
   receiving seismic data at the receivers, such data generated in response to the initiation of the plurality of seismic sources.

2. The method of claim 1, wherein the positioning of said first and second vibratory sources is determined in reference to a planned position for said sources.

3. The method of claim 1, wherein the positioning of said first and second vibratory sources is determined in reference to one another.

4. The method of claim 1, wherein the positioning of said first and second vibratory sources is determined through use of one or more global positioning systems.

5. The method of claim 1, wherein said plurality of vibratory seismic sources are actuated at a first relative placement of said first and second sources; and wherein said plurality of vibratory seismic sources are actuated at a second relative placement of said first and second sources.

6. The method of claim 1, wherein said receivers are actuated in a plurality of groups, and wherein the signals are recorded by a first receiver group at said first relative placement of said first and second sources; and wherein the signals are recorded by a second receiver group at said second relative placement of said first and second sources.

7. The method of claim 1, further comprising:
   actuating at least two seismic sources at first and second locations, the first and second locations respectively spaced on first and second sides of a common center point; and
   actuating at least two seismic sources at third and fourth locations, the third and fourth locations respectively spaced on said first and second sides of said common center point, and
   wherein the distance between the first location and the third location is different than the distance between the first location and the common center point, and the distance between the second location and the fourth location is different than the distance between the second location and the common center point.

8. The method of claim 7, wherein the first and second locations are generally symmetrically located to the common center point, and wherein the third and fourth locations are generally symmetrically located to the common center point.

9. A method of operating vibratory seismic sources in a land-based system, comprising the acts of:
   placing at least first and second vibratory seismic sources generally in accordance with a predetermined configuration;
   determining the relative positions of the first and second vibratory seismic sources at a control system through use of a positioning system in communication with the control system through a wireless communication link;
   based on the determined positions of said sources, determining an actuation interval between actuation of said first and second sources;
   sending signals from said control system through a wireless communication link to initiate said sources in accordance with said determined actuation interval.

10. The method of claim 9, wherein said positioning system comprises a GPS-based location system.

11. The method of claim 9, wherein at least one of said wireless communication links comprises a radio frequency link.

12. A system for use in a land-based seismic exploration system having a plurality of vibratory sources and a plurality of receivers, comprising:
- a trigger unit in at least selective communication with each source in said plurality of sources, and configured to transmit an initiation signal to each source;
- a control unit in at least periodic communication with the trigger unit, the control unit configured to receive data related to the positions of each source of the plurality of sources, the control unit comprising one or more processors;
- a machine-readable medium in operative communication with the one or more processors, the machine readable medium including instructions that, when executed by the one or more processors, cause the machine to perform operations comprising,
  - determining an initiation time for each source, in response to the surface positions of each source and further in response to a planned axis of propagation of the main energy beam pointing resulting from actuation of said sources;
  - communicating initiation signals to sources in accordance with said determined initiation times.

13. The system of claim 12, wherein the control unit is further configured to receive an intended position for each source; and wherein the operation of determining an initiation time for each source in response to the position of each source is further determined in reference to the intended position for each source.

14. The system of claim 13, wherein the system further comprises at least one GPS system associated with at least one source; and wherein said control unit is further configured to receive an actual position of that at least one source from said at least one GPS system.

15. A method of land-based seismic exploration, comprising the acts of:
- providing a plurality of seismic sources, each seismic source having an associated positioning device and a wireless communication device;
- providing a control system, wherein said control system is in at least selective wireless communication with said seismic sources;
- receiving wireless communications at said control system, said communications identifying the position of each seismic source;
- determining at least one operating parameter for said seismic sources, said first operating parameter comprising at least one of a source trigger offset between actuation of at least first and second sources of said plurality of sources and a positioning change of at least first and second sources;
- implementing said operating parameter to actuate said seismic sources.

16. The method of claim 15, wherein the method further comprises the acts of;
- determining a plurality of positions of a least first and second seismic sources relative to a source location;
- respectively actuating said first and second seismic sources at first and second locations in accordance with a first determined source trigger offset and a second determined source trigger offset; and
- respectively actuating said first and second seismic sources at third and fourth locations in accordance with a third determined source trigger offset and a fourth determined source trigger offset.

17. The method of claim 16, wherein:
the first and second locations are respectively spaced on first and second sides of a common center point; and
the third and fourth locations respectively spaced on said first and second sides of said common center point, and
the distance between the first location and the third location is different than the distance between the first location and the common center point, and the distance between the second location and the fourth location is different than the distance between the second location and the common center point.

18. The method of claim 15, wherein the operating parameter comprises a positioning change of the first and second seismic sources, and wherein the act of implementing said at least one operating parameter to actuate said seismic sources comprises:
- implementing at least one operating parameter to actuate said first and second seismic sources at first and second respective locations; and
- implementing at least one operating parameter to actuate said first and second seismic sources at third and fourth respective locations.

* * * * *